(12) United States Patent
Grinkemeyer et al.

(10) Patent No.: US 10,348,602 B2
(45) Date of Patent: *Jul. 9, 2019

(54) SYSTEMS AND METHODS FOR EVALUATING CUSTOMER PREMISES NETWORKS

(71) Applicant: Spirent Communications, Inc., San Jose, CA (US)

(72) Inventors: Douglas Grinkemeyer, Germantown, MD (US); David Dailey, Boyds, MD (US)

(73) Assignee: Spirent Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/015,092

(22) Filed: Jun. 21, 2018

(65) Prior Publication Data

US 2018/0302310 A1     Oct. 18, 2018

Related U.S. Application Data

(63) Continuation of application No. 13/353,026, filed on Jan. 18, 2012, now Pat. No. 10,033,618, which is a
(Continued)

(51) Int. Cl.
*H04M 3/22*     (2006.01)
*H04M 3/51*     (2006.01)
(Continued)

(52) U.S. Cl.
CPC .......... *H04L 43/12* (2013.01); *H04L 12/2801* (2013.01); *H04L 12/2838* (2013.01); *H04L 12/2898* (2013.01); *H04L 43/08* (2013.01); *H04L 43/50* (2013.01); *H04M 3/2227* (2013.01); *H04L 41/5009* (2013.01); *H04M 3/5116* (2013.01); *H04M 2203/053* (2013.01); *H04M 2203/257* (2013.01)

(58) Field of Classification Search
CPC ..... H04L 41/5009; H04L 43/12; H04L 43/50; H04L 12/2801; H04M 3/2227
See application file for complete search history.

(56) References Cited

U.S. PATENT DOCUMENTS 4,484,218 A    11/1984   Boland et al.
6,889,255 B1    5/2005   DeLuca
(Continued)

OTHER PUBLICATIONS

Telchemy—VQmon/EP, VQmon Performance, accessed on Dec. 30, 2008 at http://www.telechemy.com/vqmonperf.html, pp. 1-4.
(Continued)

*Primary Examiner* — Michael J Dalbo
(74) *Attorney, Agent, or Firm* — Haynes Beffel & Wolfeld LLP; Ernest J. Beffel, Jr.; Andrew L. Dunlap

(57) ABSTRACT

A tester system described herein enables a user (e.g., a field technician) to efficiently and conveniently upgrade, evaluate and troubleshoot customer premises networks and equipment. The tester system includes a dedicated tester device that is wirelessly coupled to a handheld device. In response to user input, the handheld device remotely controls the dedicated tester device to execute a testing routine to evaluate one or more customer premises wired and/or wireless networks.

20 Claims, 16 Drawing Sheets

Tablet Computing Device

Related U.S. Application Data continuation-in-part of application No. 12/496,545, filed on Jul. 1, 2009, now Pat. No. 8,146,125.

(51) Int. Cl.
*H04L 12/24* (2006.01)
*H04L 12/26* (2006.01)
*H04L 12/28* (2006.01)

(56) References Cited

U.S. PATENT DOCUMENTS

| | | | |
|---|---|---|---|
| 6,891,803 B1* | 5/2005 | Chang | H04L 43/50 348/192 |
| 7,075,981 B1 | 7/2006 | Clark | |
| 7,212,496 B1 | 5/2007 | Chong | |
| 7,433,925 B1 | 10/2008 | Shankar et al. | |
| 7,459,898 B1 | 12/2008 | Woodings | |
| 7,587,029 B2* | 9/2009 | Pepper | H04M 3/245 379/1.03 |
| 7,964,989 B1 | 6/2011 | Puschnigg et al. | |
| 8,146,125 B2 | 3/2012 | Grinkemeyer et al. | |
| 8,179,838 B2 | 5/2012 | Tang et al. | |
| 8,767,688 B2 | 7/2014 | Qian et al. | |
| 9,191,282 B2 | 11/2015 | Kakadia et al. | |
| 10,033,618 B1* | 7/2018 | Grinkemeyer | H04L 43/12 |
| 2002/0010854 A1 | 1/2002 | Ogura et al. | |
| 2004/0073437 A1 | 4/2004 | Halgas et al. | |
| 2004/0124864 A1 | 7/2004 | Feld et al. | |
| 2006/0221876 A1 | 10/2006 | Kosanovic et al. | |
| 2006/0234698 A1 | 10/2006 | Fok et al. | |
| 2006/0264178 A1* | 11/2006 | Noble | H04B 17/0085 455/67.11 |
| 2007/0121712 A1* | 5/2007 | Okamoto | H04L 1/24 375/222 |
| 2007/0180485 A1* | 8/2007 | Dua | H04L 29/06027 725/114 |
| 2007/0234135 A1* | 10/2007 | Boyes | H04L 1/20 714/704 |
| 2008/0013612 A1 | 1/2008 | Miller et al. | |
| 2008/0089239 A1 | 4/2008 | Todd et al. | |
| 2008/0120675 A1 | 5/2008 | Morad et al. | |
| 2008/0285476 A1 | 11/2008 | Rajakarunanayake | |
| 2009/0031185 A1 | 1/2009 | Xhafa et al. | |
| 2009/0046595 A1 | 2/2009 | Clark | |
| 2009/0113045 A1 | 4/2009 | Kozisek | |
| 2009/0147719 A1 | 6/2009 | Kang | |
| 2009/0248794 A1 | 10/2009 | Helms et al. | |
| 2009/0282455 A1 | 11/2009 | Bell et al. | |
| 2009/0296584 A1 | 12/2009 | Bernard et al. | |
| 2009/0303876 A1 | 12/2009 | Wu | |
| 2009/0328098 A1 | 12/2009 | Beyabani | |
| 2010/0150319 A1 | 6/2010 | Irenze et al. | |
| 2010/0315942 A1 | 12/2010 | Jackson et al. | |
| 2010/0324855 A1 | 12/2010 | Parker | |
| 2011/0022641 A1 | 1/2011 | Werth et al. | |
| 2011/0055632 A1* | 3/2011 | Zimmerman | G06F 11/2294 714/31 |
| 2011/0107220 A1 | 5/2011 | Perlman | |
| 2011/0107389 A1 | 5/2011 | Chakarapani | |
| 2011/0125897 A1 | 5/2011 | Qian et al. | |
| 2011/0149720 A1 | 6/2011 | Phuah et al. | |
| 2012/0078994 A1 | 3/2012 | Jackowski et al. | |
| 2012/0140641 A1 | 6/2012 | Reese et al. | |
| 2012/0239794 A1 | 9/2012 | Klein | |
| 2013/0222640 A1 | 8/2013 | Baek et al. | |
| 2013/0343467 A1 | 12/2013 | Sogani et al. | |
| 2014/0105036 A1 | 4/2014 | Anschutz | |
| 2014/0254392 A1 | 9/2014 | Wolcott et al. | |
| 2014/0359389 A1 | 12/2014 | Seastrom et al. | |
| 2015/0029869 A1 | 1/2015 | Wolcott et al. | |

OTHER PUBLICATIONS

Clark, Alan, "Non-Intrusive Monitoring of VoIP Call Quality," Telechemy Incorporated, 2002, pp. 1-29.

VQmon/SA-VM 2.2, Telchemy, Incorporated, 2006, pp. 1-2.

CompuLab Products page: CM-X270 Computer-On-Module, accessed on Dec. 30, 2008 at http://www.compuland.co.il/x270cm/html/x270-cm-datasheet.htm, pp. 1-4.

Stascheit, Bernhard, et al., "The Use of Ethernet-Over-Coax in HFC Networks", 2007, 5 pgs.

U.S. Appl. No. 12/496,545—Non-final Office Action dated Jul. 21, 2011, 19 pages.

U.S. Appl. No. 12/496,545—Response to Non-final Office Action dated Jul. 21, 2011, dated Oct. 20, 2011 12 pages.

U.S. Appl. No. 12/496,545—Notice of Allowance dated Nov. 30, 2011, dated Oct. 20, 2011, 8 pages.

U.S. Appl. No. 13/353,026—Non-final Office action dated Nov. 26, 2014, 21 pages.

U.S. Appl. No. 13/353,026—Response to Non-final Office action dated Nov. 26, 2014 dated May 22, 2015, 78 pages.

U.S. Appl. No. 13/353,026—Non-final Office action dated Sep. 28, 2015, 50 pages.

U.S. Appl. No. 13/353,026—Response to Non-final Office action dated Sep. 28, 2015, dated Jan. 28, 2016, 28 pages.

U.S. Appl. No. 13/353,026—Final Office action dated May 19, 2016, 49 pages.

U.S. Appl. No. 13/353,026—Response to Final Office action dated May 19, 2016, dated Jul. 25, 2016, 53 pages.

U.S. Appl. No. 13/353,026—Advisory action dated Sep. 6, 2016, 10 pages.

U.S. Appl. No. 13/353,026—Rule 131 Affidavit filed Feb. 16, 2017, Sep. 6, 2016, 175 pages.

U.S. Appl. No. 13/353,026—Non-final Office action dated Mar. 8, 2017, 30 pages.

Monk, A., et al., "The Multimedia Over Coax Alliance," Proceedings of the IEEE, San Diego, CA, Copyright 2013, 17 pages.

"MoCA Installation and Troubleshooting Reference Guide," Cisco Systems Inc., Lawrenceville, GA, Copyright Aug. 2012, 26 pages.

Ansley, C., MoCA Troubleshooting Experiences, Recommendations for Efficient Installations, Suwanee, GA, Retrieved online: <http://www.arrisi.com/dig_lib/white_papers/_docs/MoCA_Troubleshooting.pdf>, accessed Jan. 20, 2015, 17 pages.

"MoCA Networking FAQ and Troubleshooting," TiVo Inc., Copyright 2013, Retrieved online: <http://support.tivo.com/app/answers/detail/a_id/2412>, accessed Jan. 20, 2015, 3 pages.

U.S. Appl. No. 14/810,898—Non-final Office Action dated Jul. 28, 2016, 20 pages.

U.S. Appl. No. 14/810,898—Final Office Action dated Sep. 23, 2016, 21 pages.

U.S. Appl. No. 14/810,898—Response to Final Office Action dated Sep. 23, 2016, filed Nov. 17, 2016, 8 pages.

"CPE WAN Management Protocol v1.1—TR-069," Broadband Forum, Technical Report, Version 1 Amendment 2, Version Date of Dec. 2007, 138 pages.

U.S. Appl. No. 14/810,898—Advisory Action dated Dec. 9, 2016, 7 pages.

Wireless Broadband Router MI424WR, Rev. 1 User Manual, Verizon, 2011, 205 pages.

Hardware Design Guide, MoCA 2.0 Network Interface using the EN2710, EN1410 and EN 1050 Chip Set, Entropic Communications, 2011, 46 pages.

Ethernet to Coax MoCA Network Adapter model ECB2200, Actiontec.com, 2009, 2 pages.

Spirent Tech-X Flex Field Test Solution for Telcos and MSOs, Spirent Communications, 2012, 4 pages.

The Future of MPEG Video Transport Over QAM, CED magazine, Dec. 4, 2013, 10 pages, accssed at (http://www.cedmagazine.com/article/2013/01/future-mpeg-video-transport-over-qam).

Deploying Enhanced Media Services with MoCA, The Challenges and Rewards of MoCA Deployment for the Home Network, Society of Cable Telecommunications Engineers, 2009, 29 pages, accessed at (http://www.mocalliance.org/marketing/whitepapers/Branded_Implication_Paper_MoCA.pdf).

(56) References Cited

OTHER PUBLICATIONS

U.S. Appl. No. 14/810,898—Non-final Office Action dated Jul. 28, 2016, filed Aug. 24, 2016, 9 pages.
U.S. Appl. No. 13/353,026—Response to Non-final Office action dated Mar. 8, 2017, filed Jul. 31, 2017, 16 pages.
U.S. Appl. No. 13/353,026—Final Office action dated Nov. 1, 2017, 40 pages.

\* cited by examiner

Fig. 6A

| | |
|---|---|
| IP Address: | 172.24.192.99 |
| MAC Address: | 00:05:CA:80:DC:33 |
| Security SID: | nonBPI-405 |
| Config File: | Basic.cfg |
| TFTP Server: | 192.168.11.19 |
| DHCP Server: | 192.168.11.19 |
| TOD Server: | 192.168.11.19 |
| BPI+ Status: | Disabled |
| EAE Status: | Disabled |

Fig. 6B

DOCSIS Version: 2.0   Elapsed Time: 00:00:06

| | Downstream | Upstream |
|---|---|---|
| Channel Frequency (MHz): | 561.00 | 30.00 |
| Modulation: | 256QAM | 8QAM |
| Channel Width (MHz): | 6.0 | 3.2 |
| Level (dBmV): | 28.48 | 58.21 |
| MER (dB): | 30.43 | |
| BER (Pre-FEC): | 0.00e+00 | |
| BER (Post-FEC): | 0.00e+00 | |
| Errored Seconds: | 0 | |
| Severely Errored Seconds: | 0 | |

Retrieving Stats...

"TRACEROUTE TO 74.126.224.112, 5 HOPS MAX"

" 1  8 MS  6 MS  1 MS 10.30.100.1"

" 2  77 MS  4 MS  5 MS 96.241.201.1"

" 3  9 MS  9 MS  7 MS 130.81.184.200"

" 4  4 MS  4 MS  5 MS 130.81.22.56"

" 5  6 MS  7 MS  7 MS 152.63.37.121"

SYSTEMS AND METHODS FOR EVALUATING CUSTOMER PREMISES NETWORKS

CROSS-REFERENCE TO RELATED APPLICATIONS

This application is a continuation U.S. application Ser. No. 13/353,026, filed 18 Jan. 2012, titled SYSTEMS AND METHODS FOR EVALUATING CUSTOMER PREMISES NETWORKS", now U.S. Pat. No. 10,033,618, issued 24 Jul. 2018 which is a continuation-in-part of U.S. application Ser. No. 12/496,545, titled "COMPUTERIZED DEVICE AND METHOD FOR ANALYZING SIGNALS IN A MULTIMEDIA OVER COAX ALLIANCE (MOCA) NETWORK AND SIMILAR TDM/ENCRYPTED NETWORKS", filed on 1 Jul. 2009, now U.S. Pat. No. 8,146,125, issued 27 Mar. 2012, which is incorporated by reference herein.

BACKGROUND

The present disclosure relates to the testing of communication networks. More particularly, the present disclosure relates to techniques for evaluating and troubleshooting of customer premises networks and equipment.

Many media and telecommunication services, such as telephone and cable services, rely on customer premises wired and/or wireless networks to route their services throughout the customer's home or small business site. As the interface between the customer and the service provider's network, these customer premises networks can be a frequent source of customer service issues.

For example, wiring inside homes can be a source of problems. In older homes, copper wire that may be sufficient for phone calls might become degraded to the point that it is not optimal for triple play or even data services. Similarly, coaxial cable can be degraded by the presence of open and short circuits, cable impedance mismatches and bad connectors. Moreover, in many instances the customer premises includes a wireless network. Issues such as interference and other distortions within the premises can lead to wireless connectivity problems and disruptions in service.

In the past, service providers have considered the customer premises networks to be the customer's responsibility. However, due to the rising competition from a wide variety of telecommunication services now available in the marketplace, providers now view the customer premises networks as a potential stumbling block which can mean keeping or losing customers.

In order to attract new customers and retain existing ones, service providers have thus begun to take on the responsibility for delivery of their services across the customer premises networks. However, customer service related expenses associated with the qualification of service delivery throughout the premises, and the troubleshooting of transport and service related issues associated with the customer premises network and equipment, can impose significant costs. In particular, service issues that cannot be resolved over the phone often require a field technician to visit the customer premises, which can be time consuming and expensive.

It is therefore desirable to provide systems and methods that enable efficient evaluation and troubleshooting of customer premises networks and equipment by field technicians or other testers.

SUMMARY

Systems and methods are described that enable a field technician or other user to efficiently and conveniently upgrade, evaluate and troubleshoot customer premises networks and equipment. A tester system is described that includes a dedicated tester device that is wirelessly coupled to a handheld device, such as a mobile phone or tablet computing device.

The handheld device executes an application that provides a user interface which allows a field technician, or other user, to wirelessly control the dedicated tester device to perform various network evaluation and troubleshooting tasks. The dedicated tester device includes the connectors and capabilities to receive and analyze a signal carried on a customer premises network, in response to command data received from the handheld device. Upon completing the analysis, the dedicated tester device can then wirelessly transmit reports indicating the results of the analysis for display on the handheld device.

The tester system described herein obviates the need to provide a single, highly specialized device that includes the necessary resources to both conduct the test and display analyzed results to the technician. The handheld device allows the field technician to control the test and view the results in a manner that provides increased convenience and comfort, without limiting or compromising the types of tests that can be performed by the system. In addition, the dedicated tester device can be placed at a location necessary to connect to the customer premises network, while the field technician can control the test and view the results throughout the customer premises, at locations that may be more convenient.

Other aspects and advantages of the present invention can be seen on review of the drawings, the detailed description, and the claims which follow.

BRIEF DESCRIPTION OF THE DRAWINGS

FIGS. 5A, 5B, 5C, 5D, 6A, 6B, 6C, 6D, 7A, 7B, 7C, 7D, 7E, 8, 9, 10, 11 and 12 are examples of the user interface of a handheld device that can be used to control the dedicated tester device and view the test results.

DETAILED DESCRIPTION

Figure 1:
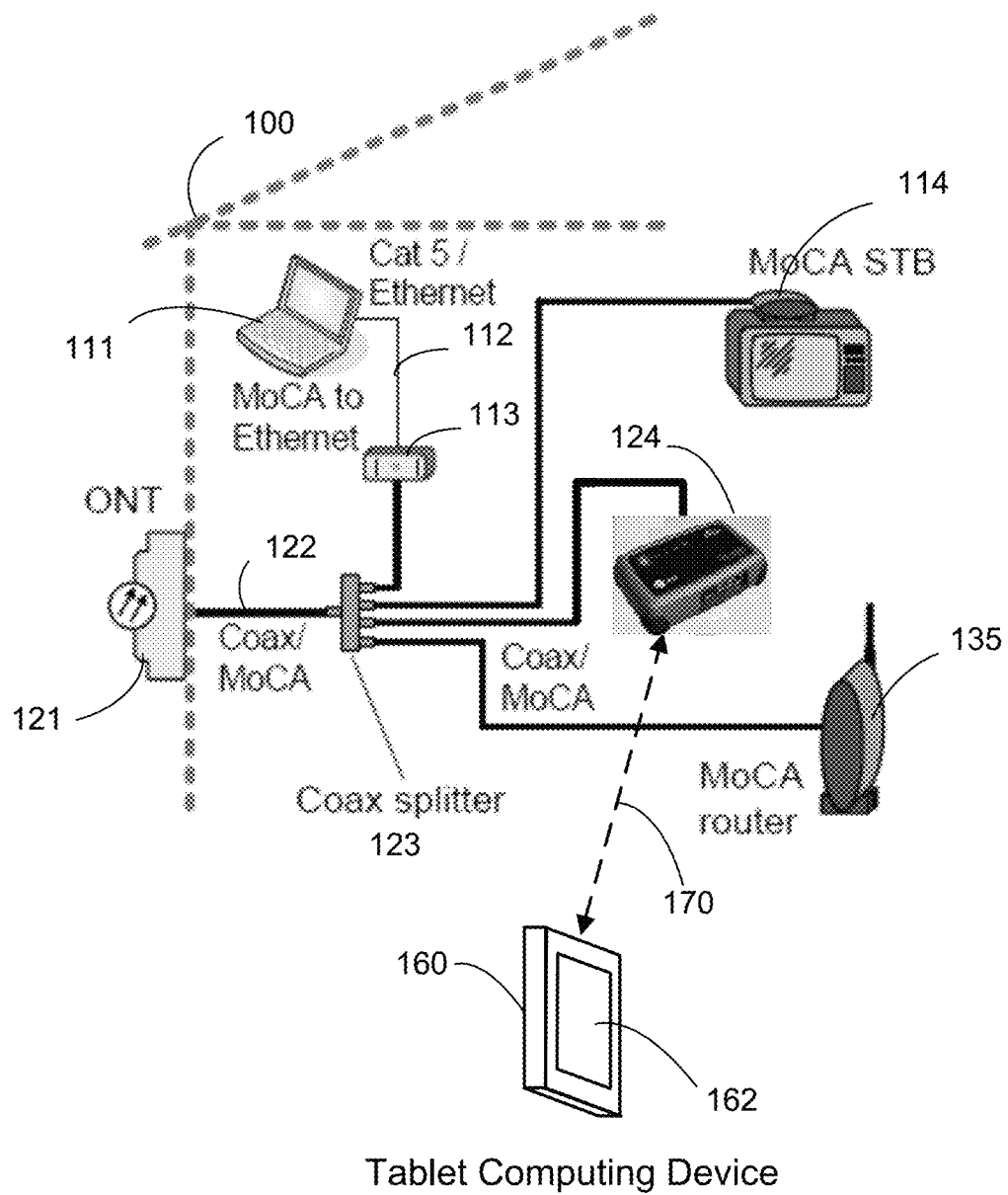
FIG. 1 illustrates a block diagram of an example environment for evaluating a customer premises network using a tester system as described herein.

A tester system described herein enables a user (e.g., a field technician) to efficiently and conveniently evaluate and troubleshoot customer premises networks and equipment. The tester system includes a dedicated tester device that is wirelessly coupled to a handheld device or laptop. In response to user input, the handheld device remotely controls the dedicated tester device to execute a testing routine to evaluate one or more customer premises wired and/or wireless networks.

In some embodiments, the handheld device is a tablet computing device. As used herein, the term "tablet computing device" refers to a computing device having a visual output or screen on one side of a slate-shaped casing, inside of which contains the entire computing device (i.e., all computing components for the device). A tablet computing device is typically more compact and easier to transport than a laptop computer. An exemplary tablet computer is the iPad from Apple, Inc, Cupertino, Calif.

In other embodiments, the handheld device may be a mobile phone, or any other type of device that can be held in the hand(s) of a user and provide the functionality described herein.

The dedicated tester device includes an appropriate wired connector to connect to a customer premise wired network that will be evaluated. The wired connector may be for example an RJ-45 Ethernet connector, a coax F-connector for Home Phone Network Alliance (HPNA), Multimedia over Coax Alliance (MoCA) protocols, or cable mapping (described below), an RJ-11 connector for DSL, VOMCAP, or POTS, or any other type of connector to connect to a desired wired network. The wired connector may be a type of connector that is lacking on the handheld device.

The tester device also includes a wireless transceiver to wirelessly couple the tester device to the handheld device via a wireless link. The tester device may be wirelessly coupled to the handheld device using any suitable wireless communication protocol, such as IEEE 802.11 or Bluetooth.

The tester device also includes a signal processing module coupled to the wired connector and the wireless transceiver. The signal processing module includes logic to emulate a customer-premises equipment (CPE) to receive a communication signal on the wired connector. The type of CPE that is emulated can vary from embodiment to embodiment, and can depend on the type of customer premise network being evaluated. As examples, the tester device may emulate a set-top box, a digital subscriber line (DSL) or DOCSIS modem, router, or other component. The tester device may also provide RF meter functionality.

The signal processing module also includes logic to receive command data from the handheld device to execute a testing routine on the received communication signal. The type of testing routine can vary from embodiment to embodiment. For example, the testing of cable television signals may include single channel tests (level, MER, BER, etc.) and multi-channel tests (tilt, scan, spectrum analysis, and auto test scripts).

The signal processing module also includes logic to analyze the received communication signal during the testing routine to produce reports concerning one or more performance metrics of the received communication signal. The reports indicate the results of the analysis. The performance metrics that may be included in the reports can vary from embodiment to embodiment.

The dedicated tester device can also include components that enable the testing and troubleshooting of a wireless network. These components can include a wireless connector to couple the dedicated tester device to the wireless network via an internal or external antenna. The dedicated tester device can then analyze a wireless signal received on the wireless connector, and produce reports concerning performance metrics of the wireless signal.

FIG. 1 illustrates a block diagram of an example environment for evaluating and troubleshooting a customer premises network using the techniques described herein. In FIG. 1, a service provider delivers services to a termination point, such as an optical network terminal (ONT) 121, located inside or outside of a customer premise 100. The customer premise 100 may be for example a residence or an office building.

FIG. 1 shows a fiber-to-the-premises architecture where the ONT 121 converts an optical signal into a MoCA signal carried on a coaxial cable 122. Alternatively, broadband services could be delivered to the premises 100 using other technologies, such as high-speed DSL or RF cable.

As shown in FIG. 1, the signal carried on a coaxial cable 112 is distributed throughout a wired network within the customer premise 100 using coaxial cables coupled to a coaxial splitter 123. In this example, the CPE's that may receive the communication signal include a MoCA to Ethernet adapter 113, a set-top box 114, and a MoCA router 135. An Ethernet-based connection can be linked to a computer 111 via an Ethernet cable 112 and the adapter 113.

Several problems related to coax cabling can affect MoCA performance, or even prevent MoCA transport completely. A fault in a coax cable, such as a nail through the cable, can prevent transmission by causing a short. A critical short circuit can prevent the transport of any MoCA signaling, including over a wide area network (WAN) and a local area network (LAN). A bad connection, perhaps caused by corrosion, a loose connector, or poor connector crimping, can impact a segment of the network. Attenuation or weakening of the signal due to the excessive use of splitters or splitter configurations can make the signal unusable. In particular, the presence of "splitter jumps," where two devices communicate through the outputs of one or more splitters, can impact line characteristics. Excessive cable length also attenuates the signal. A powered signal amplifier on the network can interfere with transmission, unless the amplifier is specifically designed to bypass frequencies in the MoCA spectrum, 850 to 1525 MHz. Ultimately, any condition that increases line attenuation will decrease the reach and performance of a MoCA network.

The example environment of FIG. 1 also includes a tester system. The tester system includes a dedicated tester device 124 that is wirelessly coupled to a tablet computing device 160, or other type of handheld device. The dedicated tester device 124, in conjunction with the tablet computing device 160, provides for the network qualification testing and/or troubleshooting of the MoCA network and CPE devices.

The tester system may belong to the service provider that delivers the optical signal to the ONT 121 at the premises 100. The tester system may be brought to the premises 100 by a field technician or other user, so that on-site qualification testing and/or troubleshooting of the MoCA network can be performed.

The dedicated tester device 124 includes a wired connector used to connect to the MoCA network. In this example the wired connector is an F-connector used to connect to a coax cable at the premises 100.

The dedicated tester device 124 further includes memory for storage of data and software applications, a processor for accessing data and executing applications, components that facilitate communication over the MoCA network, and a wireless transceiver that facilitates wireless communication with the tablet computing device 160 over a wireless link 170. Data may be transmitted over the wireless link 170 using any suitable wireless communication protocol, such as IEEE 802.11 or Bluetooth.

As described in more detail below, upon connection to the network, the dedicated tester device 124 is tasked with analyzing a signal received on the wired connector coupled to the MoCA network. The dedicated tester device 124 then produces reports concerning one or more performance metrics of the analyzed signal, and transmits the reports for display on the tablet computing device 160 to the user.

During operation, the tablet computing device 160 remotely controls the dedicated tester device 124 in response to user input. The tablet computing device 160 includes memory for storage of data and software applications, a processor for accessing data and executing applications, input and output devices that allow for user interaction and display of the reports, and a wireless transceiver that facilitates wireless communication with the dedicated tester device 124 over the wireless link 170.

The tablet computing device 160 executes a testing application that allows the user to provide user input concerning a testing routine to be performed by the dedicated tester device 124. In this example, the user input is received via a touch-sensitive display 162. The user input is then processed to produce command data indicating the testing routine to be performed by the dedicated tester device 124. The command data is then transmitted to the dedicated tester device 124, so that the routine can be executed.

In response to the command data, the dedicated tester device 124 executes the appropriate testing routine. The dedicated tester device 124 may locally store configuration data necessary to configure its components and perform the test. Alternatively, the tablet computing device 160 may also transmit the configuration data to the dedicated tester device 124.

During the testing routine, the dedicated tester device 124 emulates a CPE, so that the dedicated tester device 124 can join the MoCA network and receive and transmit signals on the network. The tester device 124 may for example emulate a set-top box, a router, or other component. In some embodiments, the tester device 124 includes two wired connectors, so that two coaxial cables can be connected to the tester device 124. In such a case, the tester device 124 may emulate both a set-top box to a router, and emulate the router to the set-top box. It may join a first MoCA network and create a second MoCA network that is physically isolated from the first network. The first and second networks may be MoCA networks that operate on the same frequency.

The dedicated tester device 124 then produces reports concerning one or more performance metrics of the analyzed signal. The dedicated tester device 124 then transmits the produced reports for display on the tablet computing device 160. The field technician can then view the displayed reports on the display 162 to evaluate and troubleshoot the performance of the network and CPE devices.

The testing routines performed by the dedicated tester device 124, and thus the performance metrics indicated in the produced reports, can vary from embodiment to embodiment. For example, the dedicated tester device 124 may be tasked with retrieval of statistics about other devices (or nodes) on the network, including the bandwidth between devices. The dedicated tester device 124 may also calculate signal quality statistics such as data rate, power level, signal-to-noise ratio, transmit and receive packets, and packet loss. The dedicated tester device 124 may also conduct bandwidth tests.

The dedicated tester device 124 may also perform connectivity tests such as ping, trace route and web browser. The web browser test allows the dedicated tester device 124 to simulate the connectivity of a device such as a desktop computer over HTTP.

The dedicated tester device 124 may also be tasked with video quality testing, both by actively joining a multicast stream and by passively monitoring an existing stream. In some embodiments, the quality of the video signal is expressed as a mean opinion score (MOS). The video signal may be an analog signal or a digital signal. The MOS can be calculated from an analysis of packet headers, or from an analysis of packet loss and classification of types of lost packets without decryption of encrypted video signals, or from both sets of statistics. In other embodiments, the quality of the video signal may be expressed as a media delivery index (MDI). The MDI can also be calculated from a delay factor and a media loss rate, from analysis of packet headers, or from analysis of packet loss and classification of types of lost packets without decryption of encrypted video signals.

The dedicated tester device 124 may also perform a cable mapping test of the various coaxial cables on the premises 100. In such a case, the dedicated tester device carries out Time Domain Reflectometry (TDR) or Frequency Domain Reflectometry (FDR) to identify common cabling problems such as open circuits, short circuits, cable impedance mismatches, bad connectors, termination mismatches, and bad magnets. The dedicated tester device 124 can then summarize the results of the cable mapping test in a report that can be transmitted for display on the tablet computing device 160. The dedicated tester device 124 may for example include an integrated tone generator for sending an audible tone through the cable for easy tracing.

The dedicated tester device 124 can also include components that enable the testing and troubleshooting of a wireless network on the premises 100. These components can include a wireless connector and transceiver to couple the dedicated tester device 124 to the wireless network via an internal or external antenna. In such a case, the dedicated tester device 124 may be tasked with performing various testing routines to evaluate and troubleshoot the wireless network. These test routines may include ping, trace route, IP connectivity, and wireless spectrum analysis of the received wireless signal. The dedicated tester device 124 produce reports concerning the wireless signal and transmit them for display on the tablet computing device 160.

The dedicated tester device 124 may also act as a bridge device to connect the tablet computing device 160 to a CPE device connected to the MoCA network. Bridging provides connectivity for device 160 to the network that is connected to the dedicated tester device 124. This allows data to move between device 160 and any other device on the network. In such a case, the dedicated tester device 124 may receive configuration data from tablet computing device 160 to configure itself as a bridge between a CPE on the network and the tablet computing device 160 during a testing routine. The dedicated tester device 124 can then forward command data received from the handheld device to the CPE to execute the testing routine on a signal received by the CPE via the network. The dedicated tester device 124 can also forward resulting data of the testing routine received from the CPE to the tablet computing device 160.

The dedicated tester device 124 may also execute a testing routine in conjunction with resources provided by a CPE device. In such a case, the CPE device may receive the signal to be analyzed, and the dedicated tester device 124 may provide configuration and command data to the CPE device to control the CPE device to perform various network evaluation and troubleshooting tasks. For example, the testing of an HPNA network may be carried out by providing command data to an HPNA chipset in a set top box which executes the test. The dedicated tester device 124 may receive command data from the tablet computing device 160 to perform a testing routine. In response, the dedicated tester device 124 may then transmit control data to the CPE to execute the testing routine on a signal received by the CPE via the network. The dedicated tester device 124 may then receive resulting data of the testing routine from the CPE. The dedicated tester device 124 can then produce reports concerning one or more performance metrics of the received signal based on the received resulting data. The dedicated tester device 124 can then transmit the reports for display on the tablet computing device 160.

In the illustrated embodiment, the dedicated tester device 124 does not include any user interface input devices for receiving direct user interaction corresponding to a command to execute the testing routine. In other words, the user can only control the operation of the dedicated tester device 124 via another device, such as the tablet computing device 160. In addition, the dedicated tester device 124 does not include a test display used to display the test reports. Instead, the dedicated tester device 124 relies on the tablet computing device 160 to display the test reports. The lack of the user interface input devices and a display enables the dedicated tester device 124 to be small and low-cost.

The tester system enables the field technician to control the test and view the results on the tablet computing device 160, or other type of handheld device, that can be very convenient and comfortable to carry, without limiting or compromising the types of tests that can be performed. In addition, the dedicated tester device 124 can be placed at a location necessary to connect to the network, while the field technician can control the test and view the results at various locations throughout the premises 100.

In the example above, the tester system provides for qualification testing and/or troubleshooting of the MoCA network. More generally, the techniques described herein can be utilized to provide qualification testing and troubleshooting of other types of customer premises wired and/or wireless networks, such as HPNA, Ethernet and WiFi networks.

Figure 2:
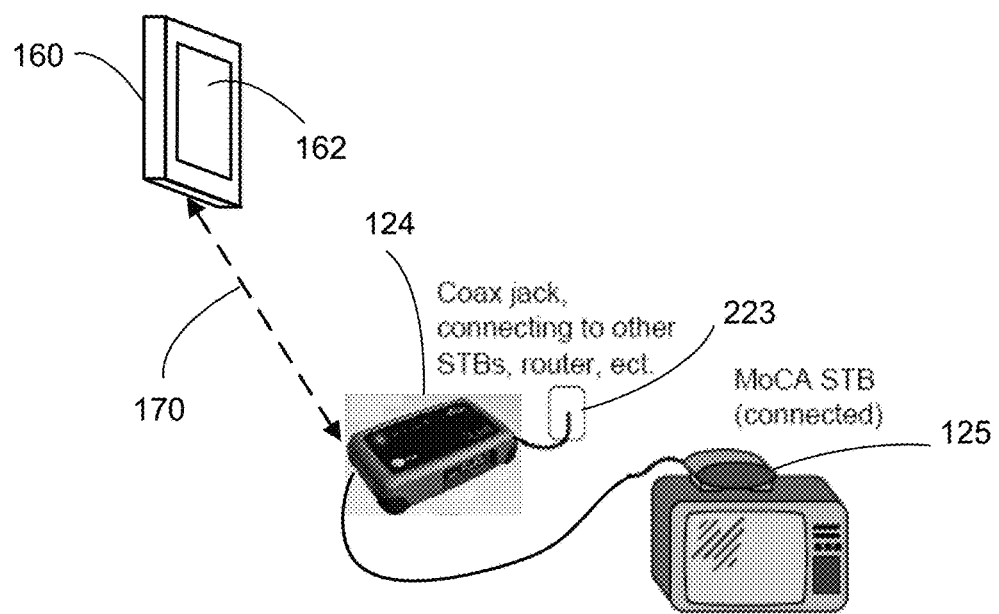
FIG. 2 illustrates a block diagram of a dedicated tester device coupled in line between a jack and a set-top box.

FIG. 2 illustrates a block diagram of the dedicated tester device 160 coupled in-line between a jack 223 and a set-top box 125. In this example, the dedicated tester device 160 is coupled in a pass-through mode to provide in-line testing of video signals on the MoCA network. In response to command data transmitted over the wireless link 170 from the tablet computing device 160, the dedicated tester device 124 measures the physical and data link characteristics of the communication signals. The dedicated tester device 160 calculates video quality statistics from packet characteristics and produces reports of the statistics for display on the tablet computing device 160.

In some embodiments, the dedicated tester device 124 may also decode the video signal carried on the coax and convert it into a format suitable for display on the tablet computing device 160. The dedicated tester device 124 can then transmit the converted video signal to the tablet computing device 160 via the wireless link 170, so that the field technician can observe the video problems in real-time on the display 162.

The dedicated tester device 124 may also be used to verify that the set-top box 125 is operating correctly. This can be particularly useful in situations in which a television or other type of display device is not readily available at the premises. The dedicated tester device 124 may include a connector to connect to the output of the set-top box 125, and convert the output video stream into a format suitable for display on the tablet computing device 160. Alternatively, the output data stream may be converted using a dongle connected between dedicated tester device 124 the output of the set-top box 125. The dongle may be for example a Dazzle dongle from Avid Pinnacle.

Figure 3:
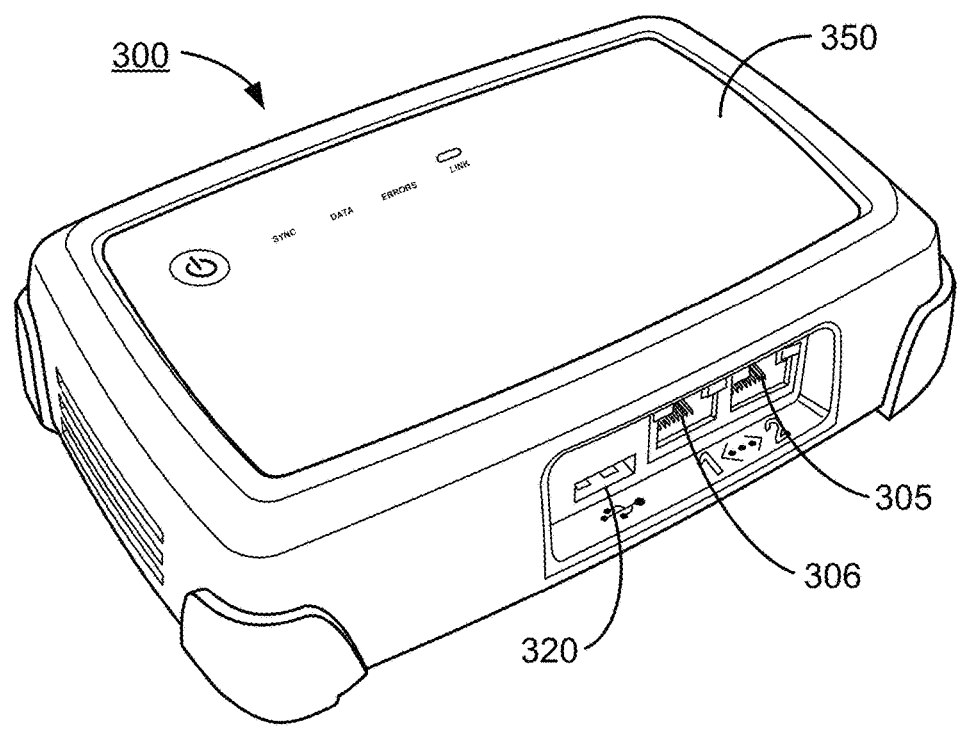
FIG. 3 depicts two examples of a dedicated tester device.

FIG. 3 depicts two views of an example of a dedicated tester device 300. The tester device 300 in this example includes a pair of Ethernet connectors 305, 306, a coaxial connector (not shown), a USB connector 320, an optional memory card slot (not shown), and an adapter (not shown) for receiving power from an external power source.

The tester device 300 includes an indicator panel 350 on the top of its enclosure. The indicator panel 350 includes a switch for power on/off of the device 300, and LED indicators that may be used to indicate synchronization, data transmission, error detection and charging status of the device 300.

Figure 4:
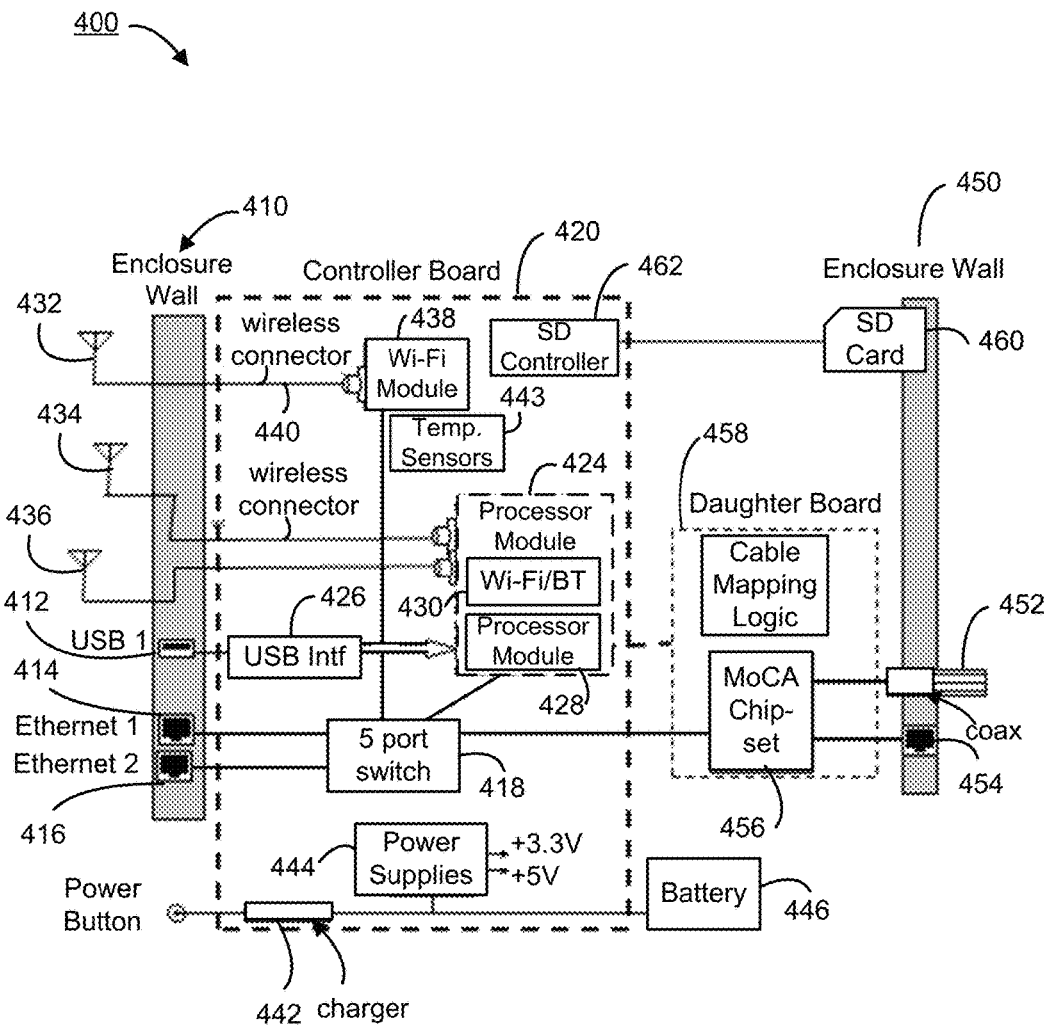
FIG. 4 illustrates an example high-level block diagram of components within a dedicated tester device.
Figure 5A:
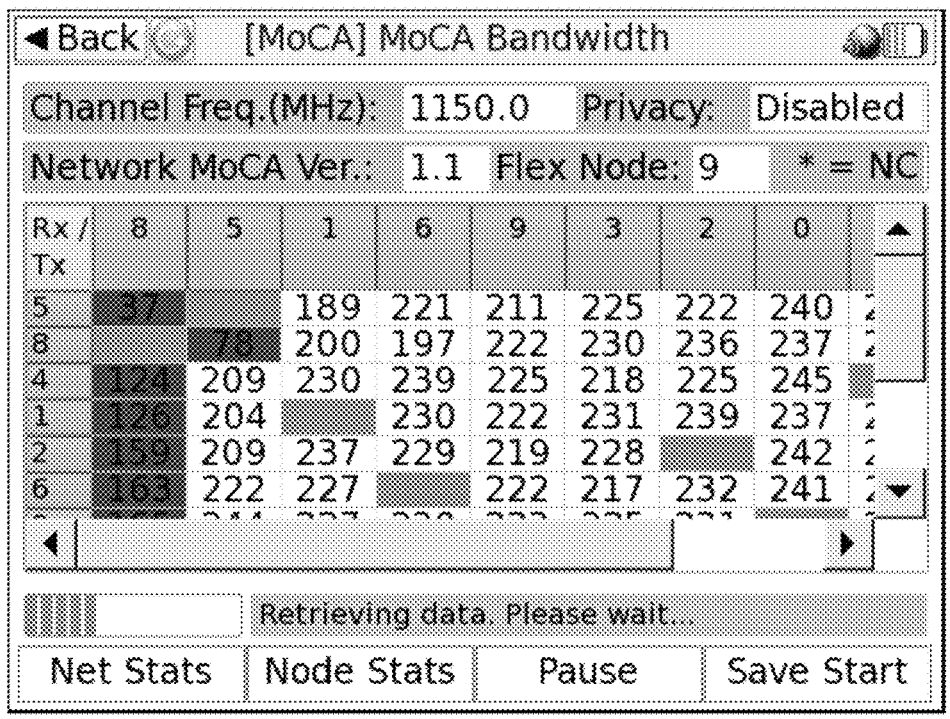
Figure 5B:
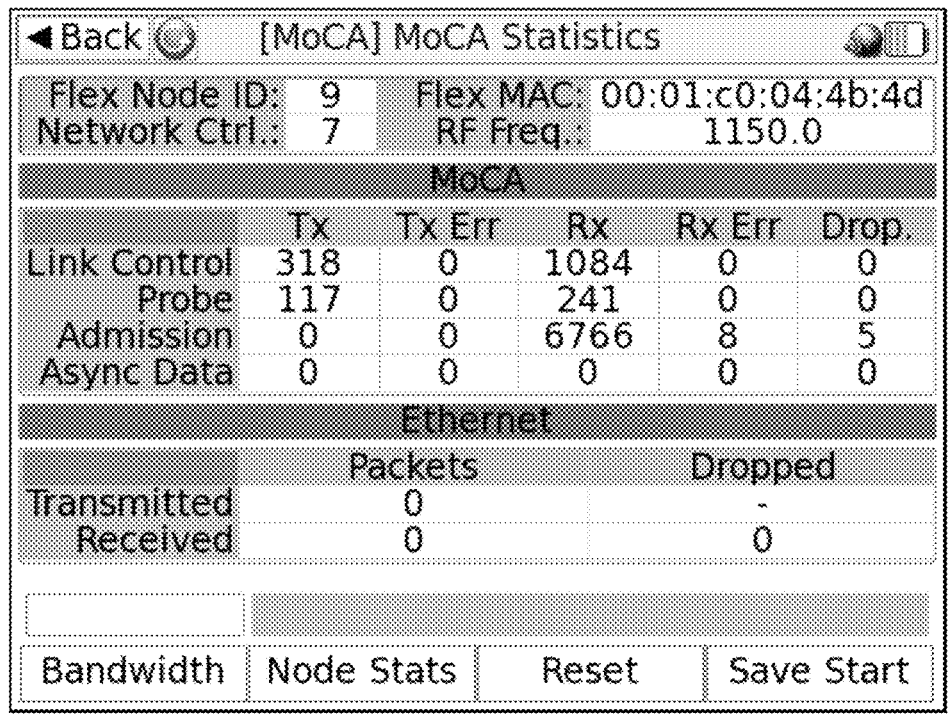
Figure 5C:
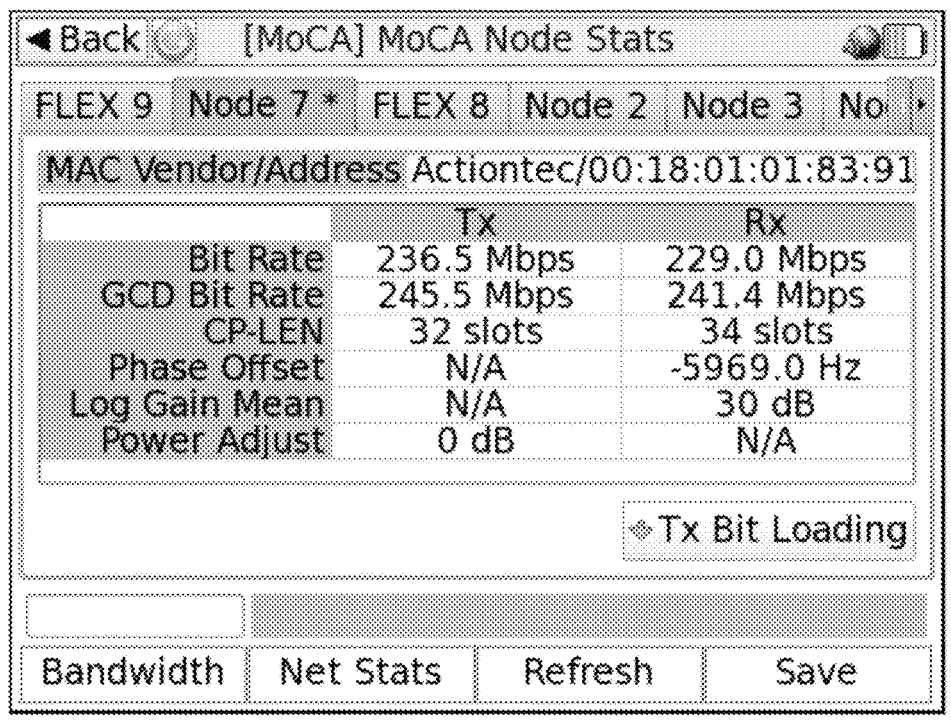
Figure 5D:
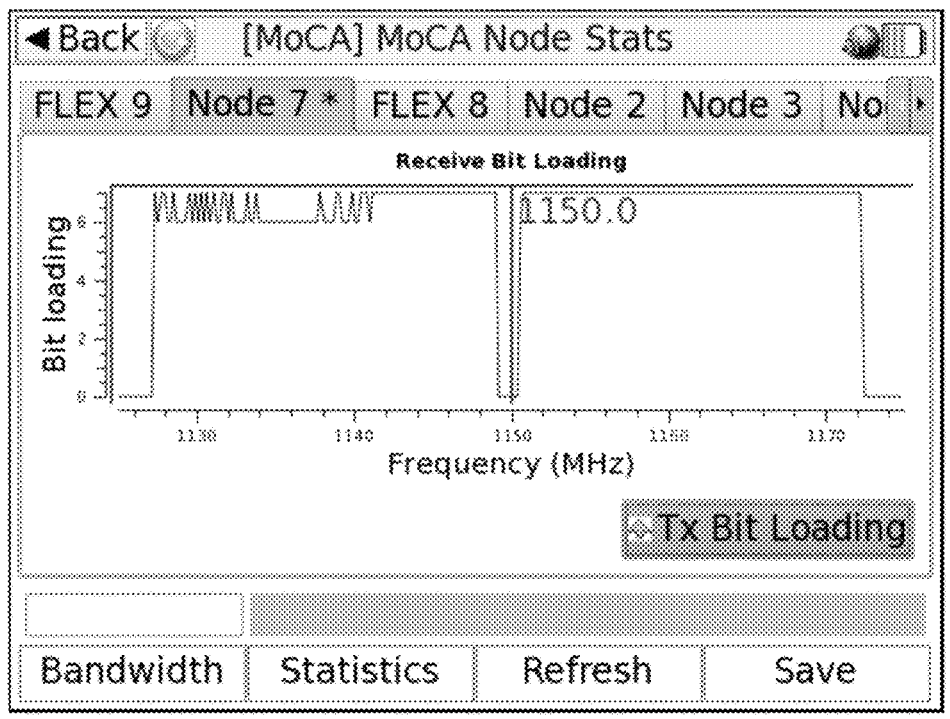
Figure 6C:
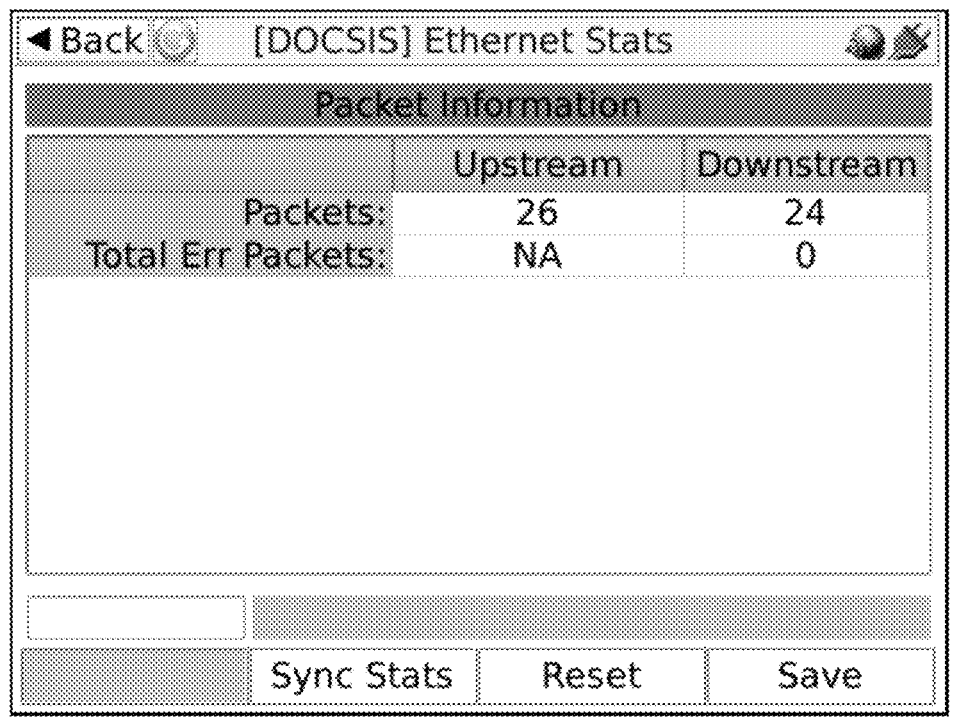
Figure 6D:
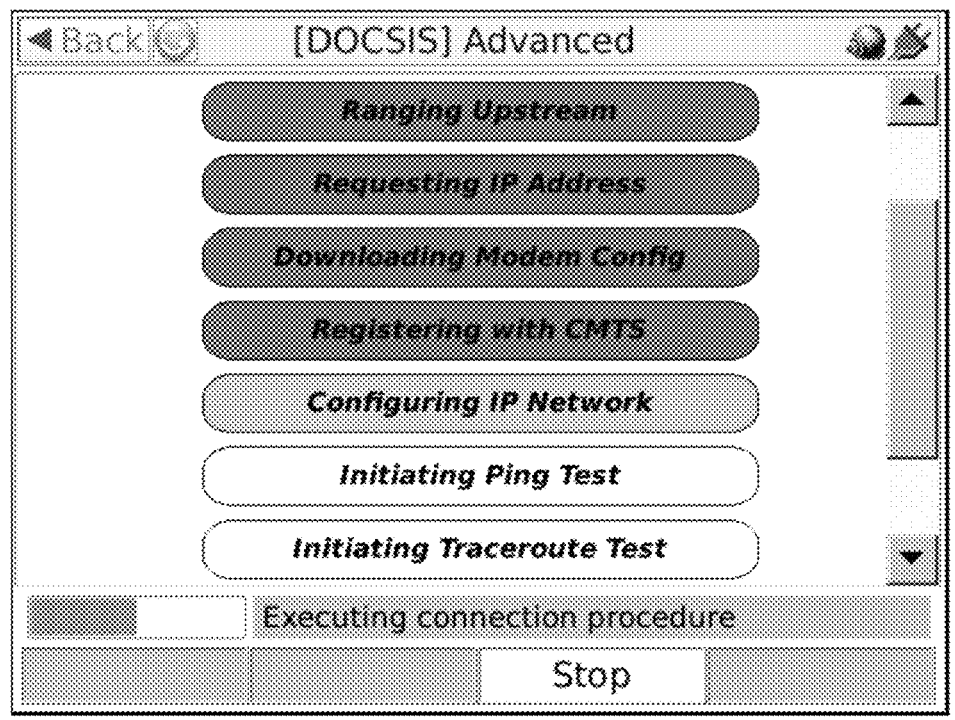
Figure 7A:
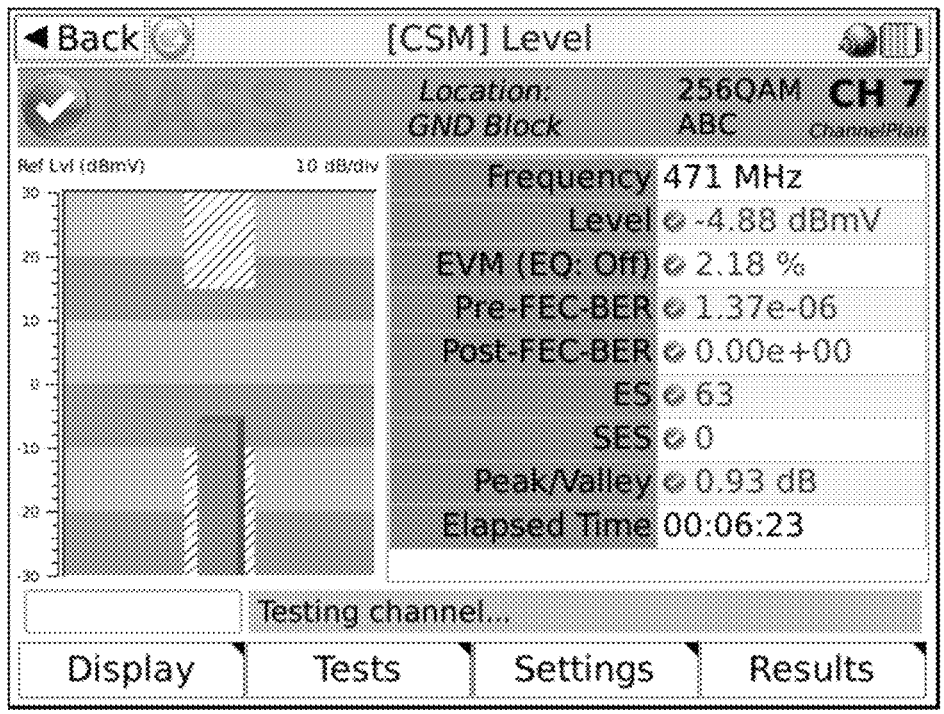
Figure 7B:
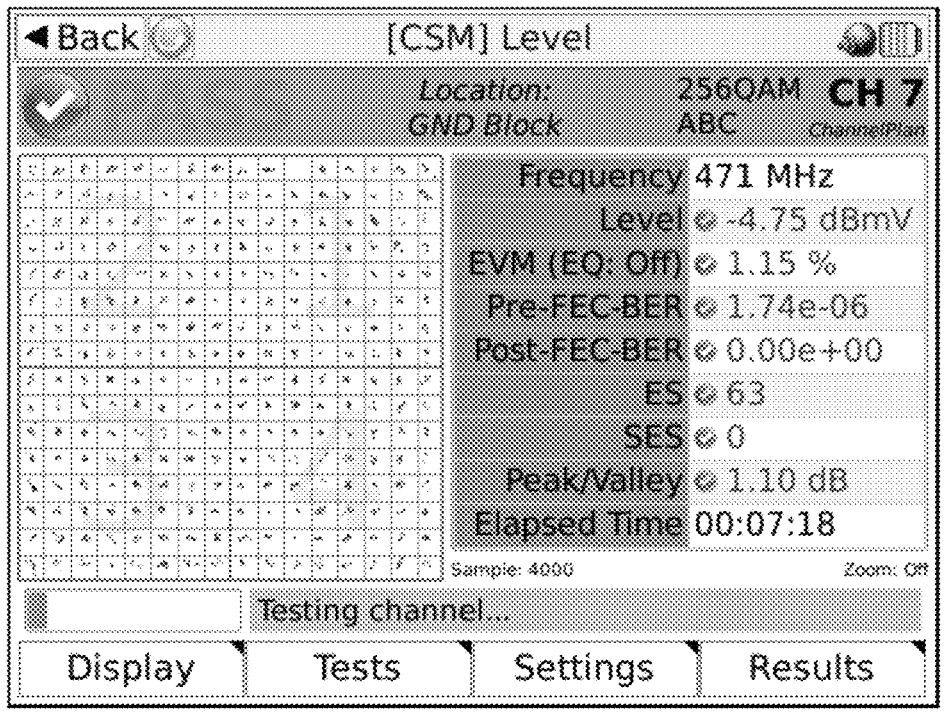
Figure 7C:
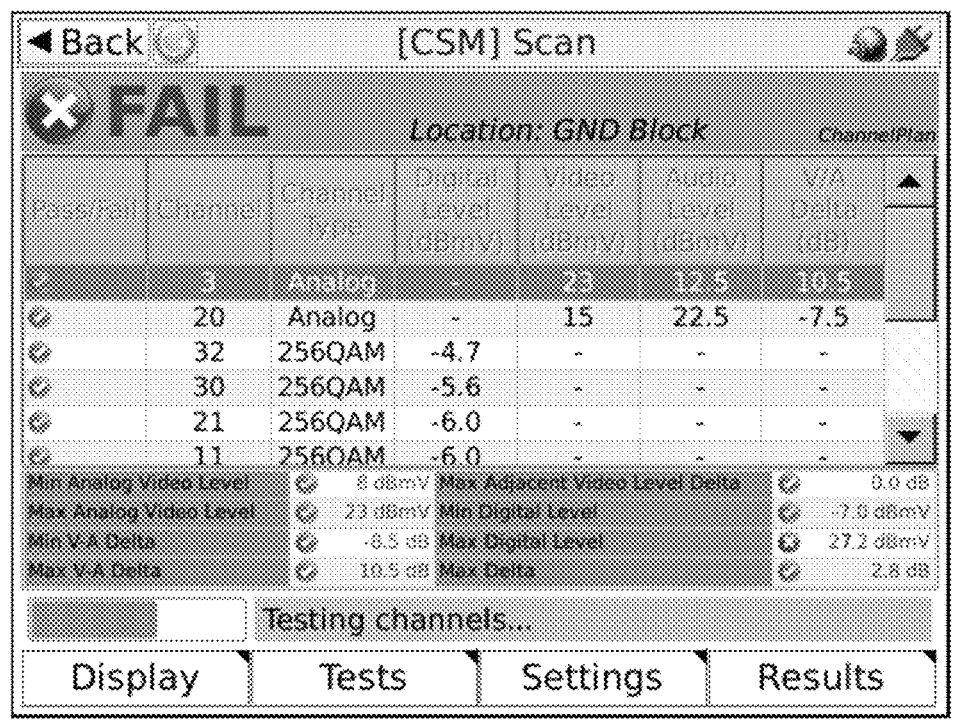
Figure 7D:
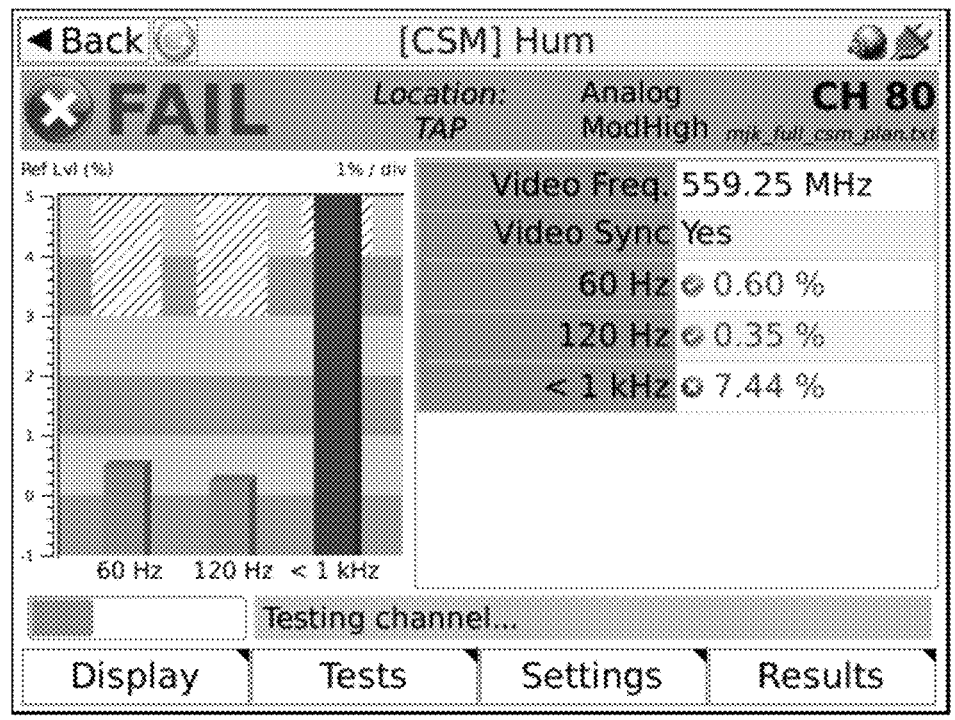
Figure 7E:
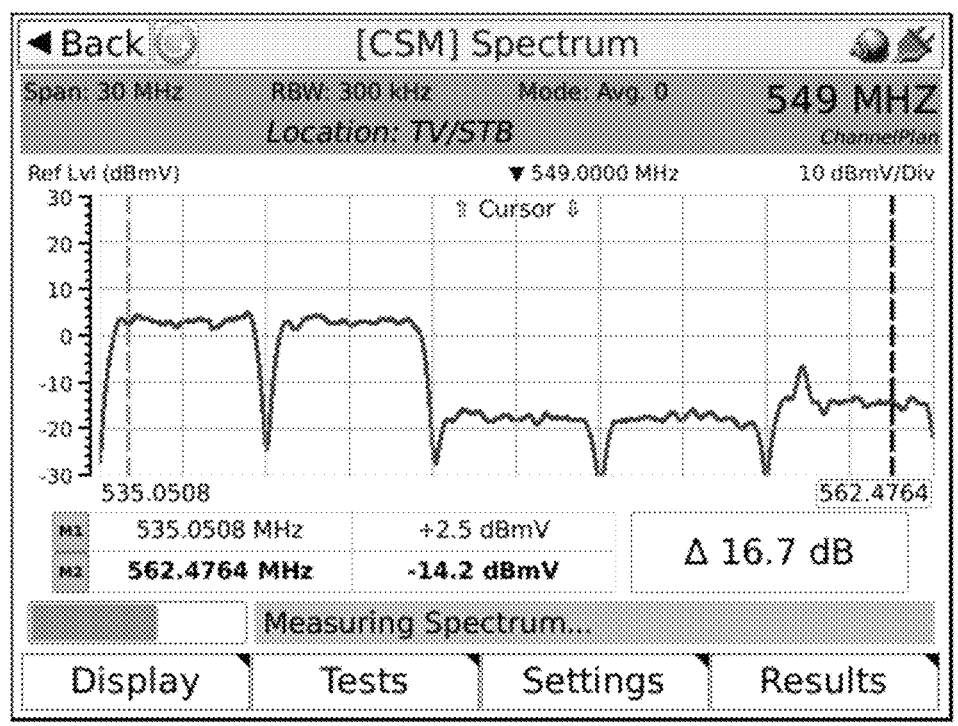

FIG. 4 illustrates an example high-level block diagram of components within a dedicated tester device 400. Some implementations may have different and/or additional components than those shown in FIG. 4. Moreover, the functionalities can be distributed among the components in a different manner than described herein.

In this example, one enclosure wall 410 of the dedicated tester device 400 includes a USB connector 426, and two RJ-45 Ethernet connectors 414, 416. The Ethernet connectors 414, 416 are coupled to a 5 port switch 418 located on a controller board 420. The 5 port switch is used to route the signals among the various components. The USB connector 412 is coupled to a processor board 422 via a USB interface 424. The processor board 422 includes a processor module 428 and a WiFi/BT module 430. The WiFi/BT module 430 enables the wireless communication/control and testing via a Bluetooth or 802.11g network. The processor module 428 includes a processor and memory for storage of instructions executable by the processor to provide some or all of the functionality described herein, including the logic to carry out the testing routines described herein.

The tester device 400 also includes three internal antennas 432, 434, 436 that are coupled to the controller board 420. The Bluetooth antenna 436 and the 802.11g antennas are coupled to the processing board 424 via corresponding wireless connectors. The 802.440 internal antenna 432 is coupled to a wi-fi module 438 via a wireless connector 840. The wi-fi module 438 enables the communication/control and testing of an 802.11ng network.

Also mounted on the controller board 420 are a charger 442, a temperature sensor 443 and a power supply 444. A battery 446 may also be housed in the enclosure.

A second enclosure wall 450 includes an SD card slot 460 that is coupled to an SD controller 462 mounted on the controller board 420. The second enclosure wall 450 also includes a coax connector 452 and an RJ-11 connector 454. The coax connector 452 and the RJ-11 connector 454 are coupled to a MoCA chipset 456 mounted on a daughter board 458. The MoCA chipset 456 provides the functionality for CPE emulation on the MoCA network and in-line testing as described herein.

Cable mapping logic 460 is also mounted on the daughter board 458. The cable mapping logic 460 stores instructions executable by the processor module 428 to provide the cable mapping functionality described above.

FIGS. 5A-12 are examples of the user interface of a handheld device that can be used to control the dedicated tester device and view the test reports.

FIGS. 5A-5D are example user interfaces for viewing test reports concerning a MoCA network.

FIGS. 6A-6D are example user interfaces for viewing test reports concerning a DOCSIS Ethernet system.

FIGS. 7A-7E are example user interfaces for viewing test reports concerning cable TV testing.

Figure 8:
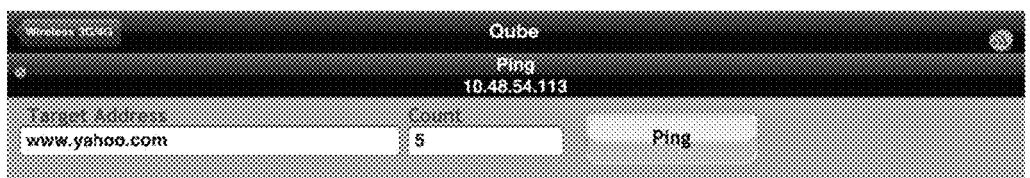

FIG. 8 is an example user interface for viewing a test report concerning a ping test.

Figure 9:
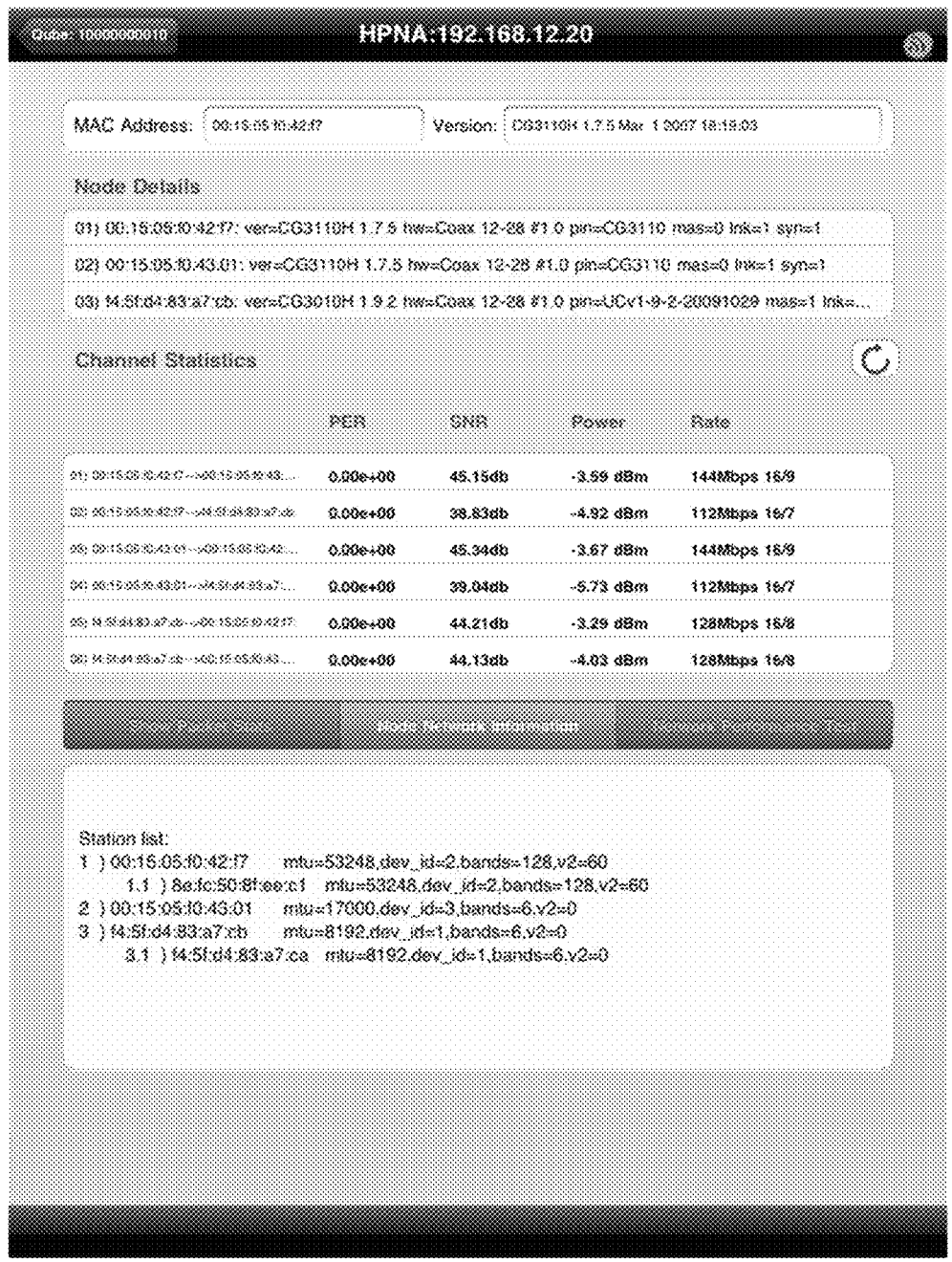

FIG. 9 is an example user interface for viewing a test report concerning an HPNA network.

Figure 10:
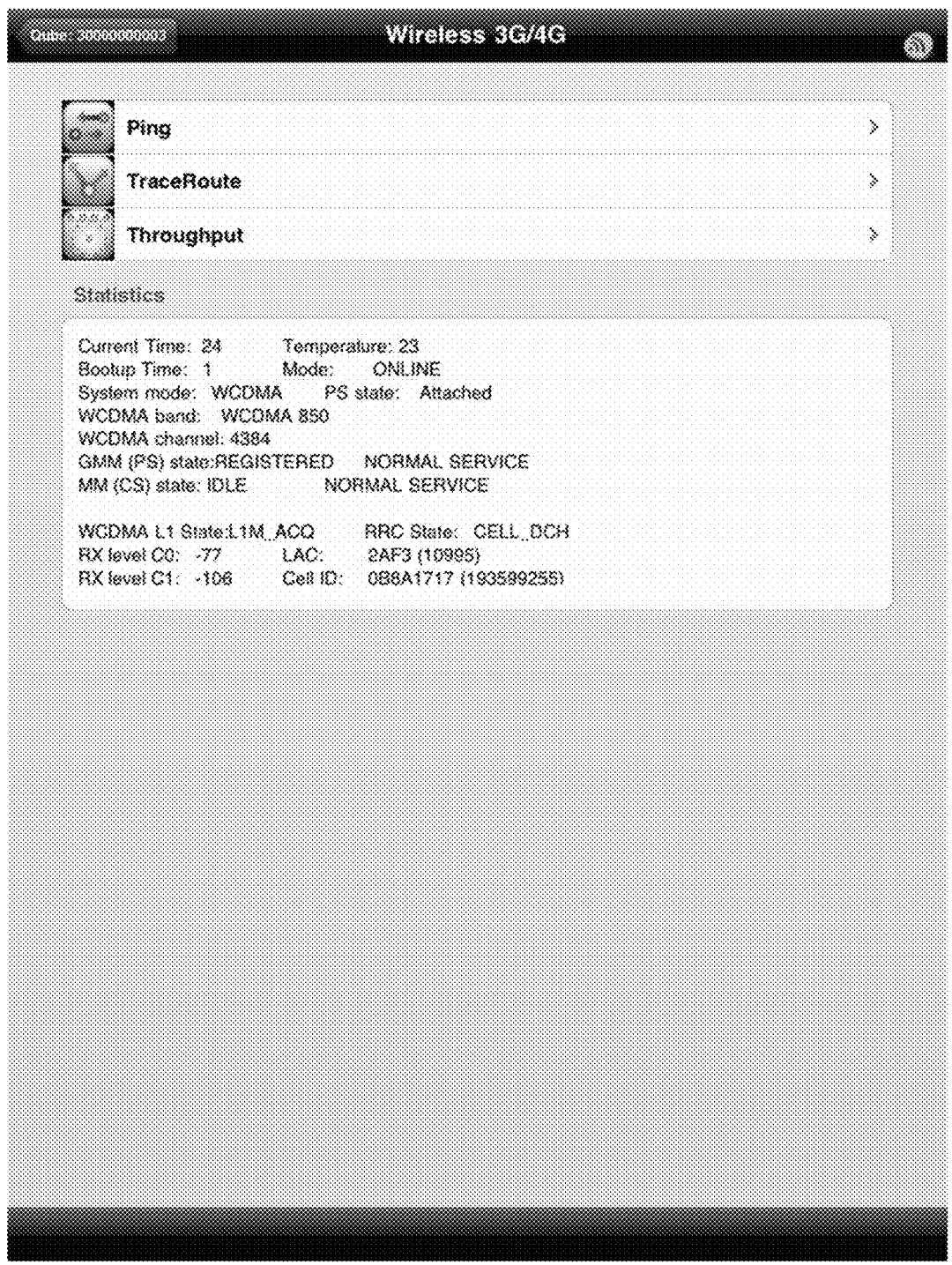

FIG. 10 is an example user interface for controlling the dedicated tester device and viewing the test reports concerning a wireless network.

Figure 11:
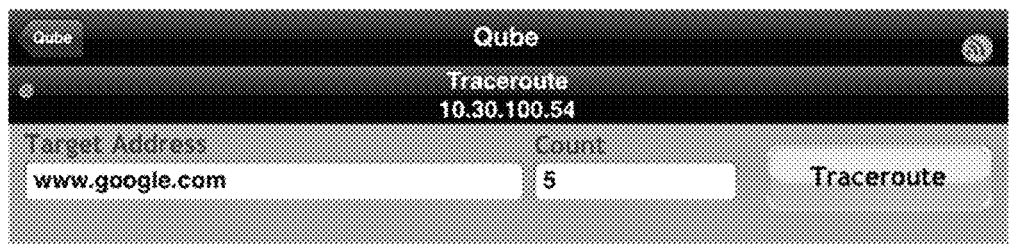
Figure 11:

FIG. 11 is an example user interface for viewing a test report concerning a trace route test.

Figure 12:
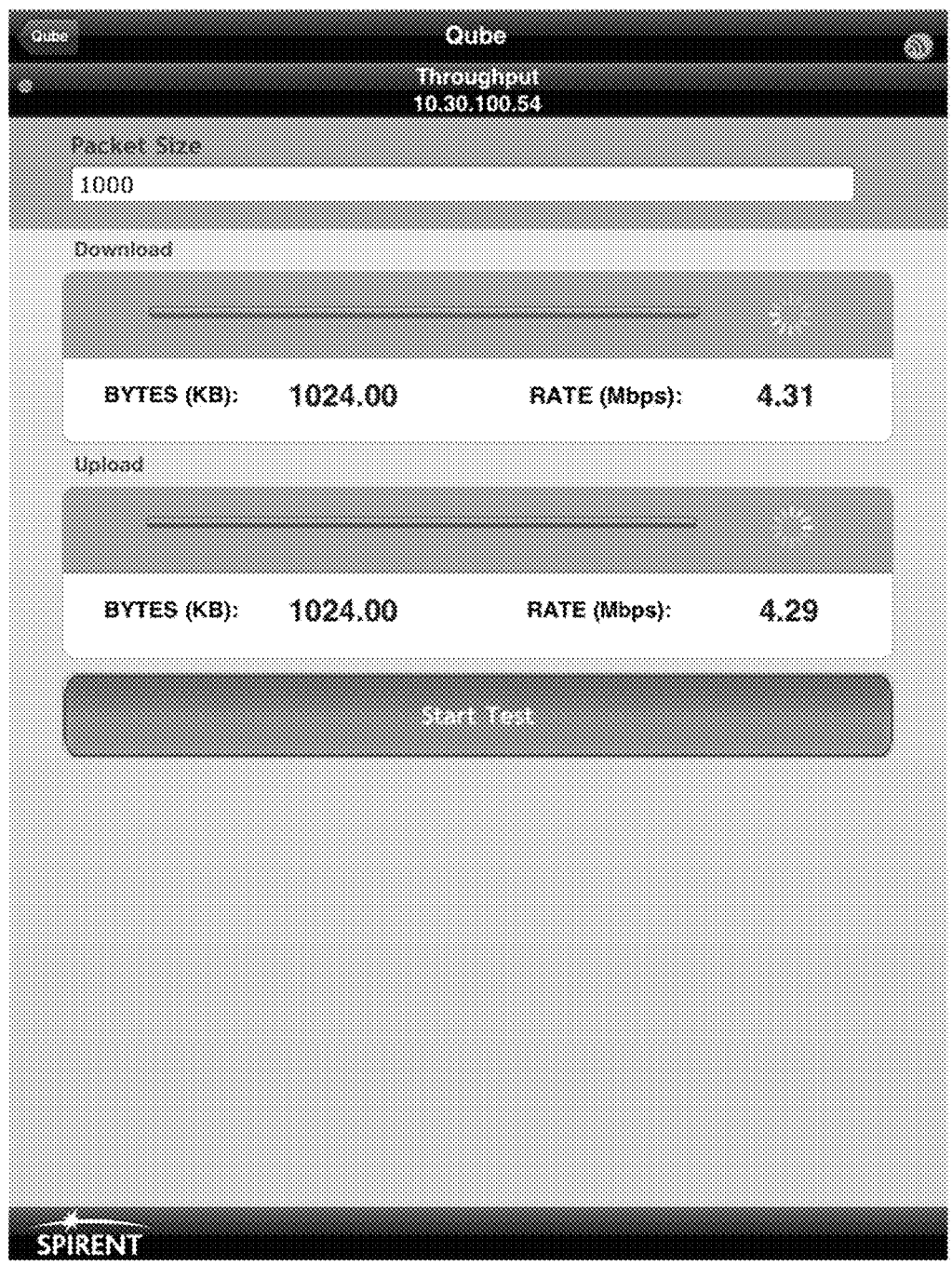

FIG. 12 is an example user interface for viewing a test report concerning a throughput test.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. A tester device to evaluate a wired network, the tester device including:
    a first wired connector to couple the tester device to the wired network;
    a second wired connector to couple the tester device to the wired network;
    wherein the tester device is not incorporated into a service provider installed interface or customer-premises equipment (CPE);
    a wireless transceiver or a bridge to a wireless transceiver to wirelessly couple the tester device to a handheld device; and
    a signal processing module coupled to the first and second wired connectors and the wireless transceiver, and including logic to:
        emulate, as the CPE, a set-top box to receive a first signal on the first wired connector;
        emulate, as the CPE, a modem to send or receive a second signal on the second wired connector;
        receive command data from the handheld device to execute a testing routine on the first signal and the second signal; and
        transmit information regarding the first signal or the second signal and the testing routine for display on the handheld device.

2. The tester device of claim 1, wherein the tester device does not include an output for displaying the information to a user.

3. The tester device of claim 1, wherein the tester device does not include a user input device for receiving direct user interaction corresponding to a command to execute the testing routine.

4. The tester device of claim 1, wherein:
    the first signal is a voice over IP signal; and
    the set-top box is emulated to receive the voice over IP signal.

5. The tester device of claim 4, wherein the voice over IP signal is analyzed to produce reports concerning video quality of the analyzed voice over IP signal.

6. The tester device of claim 4, wherein:
    the voice over IP signal is converted into a format suitable for display on the handheld device; and
    the converted voice over IP signal is transmitted to the handheld device.

7. The tester device of claim 1, wherein:
    the first signal is a video signal; and
    the set-top box is emulated to receive the video signal.

8. The tester device of claim 7, wherein the signal processing module includes logic to analyze the received video signal to produce reports concerning video quality of the analyzed video signal.

9. The tester device of claim 7, wherein the signal processing module includes logic to convert the received video signal into a format suitable for display on the handheld device, and to transmit the converted video signal to the handheld device.

10. A tester device to evaluate a wired and a wireless network, the tester device including:
    a wired connector to couple the tester device to the wired network;
    a wireless connector to couple the tester device to the wireless network;
    wherein the tester device is not incorporated into a service provider installed interface or customer-premises equipment (CPE);
    a wireless transceiver or a bridge to a wireless transceiver to wirelessly couple the tester device to a handheld device; and
    a signal processing module coupled to the wired connector and the wireless connector, and including logic to:
        receive a first signal on the wired connector;
        execute a first testing routine on the received first signal;
        receive a second signal on the wireless connector;
        execute a second testing routine on the received second signal; and
        transmit information regarding the received first signal and the first testing routine or information regarding the received second signal and the second testing routine for display on the handheld device.

11. The tester device of claim 10, wherein the information concerns a power level of the received second signal.

12. The tester device of claim 10, wherein the information concerns a frequency spectrum of the received second signal.

13. The tester device of claim 10, wherein the information indicates short circuits and open circuits within the wired network.

14. A method of evaluating a wired network using a tester device not incorporated into a service provider installed interface or customer-premises equipment (CPE), the method including:
    connecting a first wired connector and a second wired connector of the tester device to the wired network;
    wirelessly coupling the tester device to a handheld device;
    emulating a first signal on the first wired connector by emulating, as the CPE, a set-top box;
    sending or receiving a second signal on the second wired connector by emulating, as the CPE, a modem;
    receiving command data from the handheld device to execute a testing routine on the first signal and the second signal; and
    transmitting information regarding the first signal or the second signal and the testing routine for display on the handheld device.

15. The method of claim 14, wherein:
    one of the first signal and the second signal is a video signal; and
    the tester device emulates a set-top box to receive the video signal.

16. The method of claim 15, wherein the tester device analyzes the received video signal to produce reports concerning video quality of the analyzed video signal.

17. The method of claim 15, including the tester device converting the received video signal into a format suitable for display on the handheld device, and transmitting the converted video signal to the handheld device.

18. The method of claim 15, further including:
wirelessly coupling a wireless connector of the tester device to a wireless network;
the tester device receiving a second signal on the wireless connector;
the tester device receiving command data from the handheld device to execute a second testing routine on the received second signal;
the tester device analyzing the received second signal to produce reports concerning one or more performance metrics of the received second signal; and
the tester device transmitting the reports for display on the handheld device.

19. The method of claim 15, further comprising producing reports indicating short circuits and open circuits within the wired network.

20. A method of evaluating a wired network using a tester device not incorporated into a service provider installed interface or customer-premises equipment (CPE), the method including:
connecting a wired connector of the tester device to the wired network;
wirelessly coupling the tester device to a handheld device;
wirelessly coupling a wireless connector of the tester device to a wireless network;
receiving a first signal on the wired connector;
receiving a second signal on the wireless connector;
executing a testing routine on the received first signal;
executing a second testing routine on the received second signal; and
transmitting information regarding the received first signal and the first testing routine or information regarding the received second signal and the second testing routine for display on the handheld device.

* * * * *